(12) United States Patent
Arnold et al.

(10) Patent No.: US 7,487,543 B2
(45) Date of Patent: Feb. 3, 2009

(54) METHOD AND APPARATUS FOR THE AUTOMATIC DETERMINATION OF POTENTIALLY WORM-LIKE BEHAVIOR OF A PROGRAM

(75) Inventors: William C. Arnold, Mahopac, NY (US); David M. Chess, Mogehan Lake, NY (US); John F. Morar, Mahopac, NY (US); Alla Segal, Mount Kisco, NY (US); Ian N. Whalley, Pawling, NY (US); Steve R. White, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/202,517

(22) Filed: Jul. 23, 2002

(65) Prior Publication Data

US 2004/0019832 A1    Jan. 29, 2004

(51) Int. Cl.
*G08B 23/00* (2006.01)
*G06F 15/18* (2006.01)
*G06F 12/14* (2006.01)
*H04L 9/00* (2006.01)

(52) U.S. Cl. .................... 726/24; 726/25; 713/151; 713/188

(58) Field of Classification Search .............. 726/24
See application file for complete search history.

(56) References Cited

U.S. PATENT DOCUMENTS

| | | | |
|---|---|---|---|
| 5,398,196 A | 3/1995 | Chambers | 364/580 |
| 5,440,723 A * | 8/1995 | Arnold et al. | 714/2 |
| 5,636,371 A | 6/1997 | Yu | 395/500 |
| 5,734,865 A | 3/1998 | Yu | 395/500 |
| 5,812,826 A | 9/1998 | McLain, Jr. | 395/500 |
| 5,826,013 A | 10/1998 | Nachenberg | 395/186 |
| 5,842,002 A | 11/1998 | Schnurer et al. | 395/500 |

(Continued)

FOREIGN PATENT DOCUMENTS

EP    1507382 A1 *    2/2005

(Continued)

OTHER PUBLICATIONS

Cifuentes et al, Computer Security Analysis Through Decompilation and High-Level Debugging, Oct. 2001, IEEE, pp. 375-380.*

(Continued)

*Primary Examiner*—Ayaz Sheikh
*Assistant Examiner*—Aravind K Moorthy
(74) *Attorney, Agent, or Firm*—Harrington & Smith, PC (57) ABSTRACT

A method and system for the automatic determination of the behavioral profile of a program suspected of having worm-like characteristics includes analyzing data processing system resources required by the program and, if the required resources are not indicative of the program having worm-like characteristics, running the program in a controlled non-network environment while monitoring and logging accesses to system resources to determine the behavior of the program in the non-network environment. A logged record of the observed behavior is analyzed to determine if the behavior is indicative of the program having worm-like characteristics. The non-network environment may simulate the appearance of a network to the program, without emulating the operation of the network.

13 Claims, 5 Drawing Sheets

U.S. PATENT DOCUMENTS

| | | | |
|---|---|---|---|
| 5,889,943 A * | 3/1999 | Ji et al. | 726/22 |
| 5,978,917 A | 11/1999 | Chi | 713/201 |
| 6,006,328 A * | 12/1999 | Drake | 726/23 |
| 6,192,512 B1 | 2/2001 | Chess | 717/5 |
| 6,711,615 B2 * | 3/2004 | Porras et al. | 709/224 |
| 6,772,345 B1 * | 8/2004 | Shetty | 726/24 |
| 6,785,820 B1 * | 8/2004 | Muttik et al. | 726/24 |
| 6,842,861 B1 * | 1/2005 | Cox et al. | 713/188 |
| 6,886,099 B1 * | 4/2005 | Smithson et al. | 726/24 |
| 2003/0023865 A1 * | 1/2003 | Cowie et al. | 713/200 |
| 2003/0115485 A1 * | 6/2003 | Milliken | 713/201 |
| 2003/0212902 A1 * | 11/2003 | van der Made | 713/200 |
| 2004/0093514 A1 * | 5/2004 | Piazza et al. | 713/201 |
| 2004/0111531 A1 * | 6/2004 | Staniford et al. | 709/246 |
| 2004/0117640 A1 * | 6/2004 | Chu et al. | 713/188 |
| 2005/0188215 A1 * | 8/2005 | Shulman et al. | 713/188 |
| 2005/0198519 A1 * | 9/2005 | Tamura et al. | 713/188 |
| 2006/0021054 A1 * | 1/2006 | Costa et al. | 726/25 |
| 2006/0095970 A1 * | 5/2006 | Rajagopal et al. | 726/25 |
| 2006/0137012 A1 * | 6/2006 | Aaron | 726/24 |
| 2007/0043858 A1 * | 2/2007 | Lee | 709/224 |

FOREIGN PATENT DOCUMENTS

| | | | |
|---|---|---|---|
| WO | WO-02/06928 A2 | 1/2002 | |
| WO | WO 2006137657 | * 12/2006 | |
| WO | WO 2007038517 | * 4/2007 | |

OTHER PUBLICATIONS

Moskovitch et al, Detection of Unknown Computer Worms Activity Based on Computer Behavior using Data Mining, 2007, IEEE, pp. 169-177.*

Gu et al, Worm detection, early warning and response based on local victim information, 2004, IEEE, pp. 136-145.*

Cai et al, Worm Shield: Fast Worm Signature Generation with Distributed Fingerprint Aggregation, 2007, IEEE, pp. 88-104.*

Anonymous, Covad Enhances Network Protection Against Denial of Service and Bot and Worm Attacks, 2008, Business Wire, p. 1.*

Burnett, Mark, "Securing Microsoft Services", May 22, 2002, 4 pgs, website article www.securityfocus.com.

U.S. Appl. No. 09/640,453, filed Aug. 17, 2000.

Kephart, J. et al., "An Immune System For Cyberspace", IEEE, 1997, pp. 879-884.

Kephart, J. et al., "Biologically Inspired Defenses Against Computer Viruses", not dated, pp. 985-996.

Cohen, F., "A Short Course on Computer Viruses", ASP Press, Pittsburgh, PA, 1990, pp. 9-15.

Shieh, S.W., et al., "A Pattern-Oriented Intrusion-Detection Model and Its Applications", IEEE 1991, pp. 327-342.

* cited by examiner

RESOURCE ANALYZER 203
FIG.3

REPLICATOR 201
FIG.4A

BEHAVIOR PATTERN ANALYZER 204
FIG.4B

METHOD AND APPARATUS FOR THE AUTOMATIC DETERMINATION OF POTENTIALLY WORM-LIKE BEHAVIOR OF A PROGRAM

TECHNICAL FIELD

This invention relates generally to methods and apparatus for analyzing undesirable software entities, such as those known as worms, and relates more particularly to methods and apparatus for automatically identifying potentially worm-like behavior in a software program.

BACKGROUND

For the purpose of this invention a Computer Virus is defined as a self-replicating program or routine that spreads on a computer in a possibly modified manner without human interaction. A Computer Worm is defined as a program that can clandestinely send a copy of itself between computers on a computer network, and which uses a network service or services to replicate.

In the field of automated computer virus detection and analysis it is often necessary to predict what type of behavior a program will exhibit so that the program can be replicated and analyzed in the environment most appropriate for the program.

In copending and commonly assigned U.S. patent application Ser. No. 09/640,453, filed Aug. 17, 2000, entitled "Method and Apparatus for Replicating and Analyzing Worm Programs", William C. Arnold, David M. Chess, John F. Morar, Alla Segal, Morton G. Swimmer, Ian N. Whalley and Steve R. White describe an environment for the automatic replication of worms. In this commonly assigned U.S. patent application these inventors disclose both method and apparatus for dynamically analyzing software, some of whose potentially-important behaviors (such as worm-like behavior) may only be displayed when the software is executed in an environment where the software has, or appears to have, access to a production network and/or to the global Internet. The software may be executed in a real or in an emulated network environment that includes a monitoring component and an emulation component. The monitoring component serves to capture and/or record the behaviors displayed by the software and/or other components of the system, and the emulation component gives the software being analyzed the impression that it is executing with access to a production network and/or to the global Internet. The software being analyzed is effectively confined to the analysis network environment, and cannot in fact read information from, or alter any information on, any production network or the global Internet.

The inventors have realized that it would be desirable to provide a capability to specify the identity of computer worms outside of this environment. While it may be possible to use the disclosed environment for the replication of both computer software viruses and worms, it maybe inefficient, as the worm replication environment assumes the presence of a real or an emulated network that in practice can be expensive to implement.

An ability to predict if a sample of software is a potential worm, outside of the network environment, is expected to reduce the number of samples sent to the worm replication environment, and result in a significant improvement to the efficiency of automated replication and analysis systems. However, prior to this invention this need was not adequately addressed or fulfilled.

SUMMARY OF THE PREFERRED EMBODIMENTS

The foregoing and other problems are overcome, and other advantages are realized, in accordance with the presently preferred embodiments of these teachings.

Disclosed herein are embodiments of methods and apparatus for the automatic determination of the behavioral profile of a program suspected of having worm-like characteristics. A method includes analyzing data processing system resources required by the program and, if the required resources are not indicative of the program having worm-like characteristics, running the program in a controlled non-network environment while monitoring and logging accesses to system resources to determine the behavior of the program in the non-network environment. A logged record of the observed behavior is analyzed to determine if the behavior is indicative of the program having worm-like characteristics. The non-network environment may simulate the appearance of a network to the program, without emulating an actual operation of the network.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

By way of introduction, this invention provides a system and a method for the dynamic determination of a potentially worm-like behavior of a program. The method is based on the characteristics of a worm program that enable it to spread to other computers. These characteristics include, but need not be limited to, one or more of the following: (a) using Application Program Interfaces (APIs) from dynamic link libraries (dlls) to send electronic mail to another machine; (b) the automating of common mail programs such as, but not limited to, Microsoft Outlook™ and Outlook Express™; (c) the use of address books, system registry and other system resources to determine the potential recipients of the worm and/or the location of mail programs; (d) overwriting or replacing network APIs in system libraries with worm code that, if executed, would cause the inclusion of the worm code in all mail sent from the machine as an attachment, or as a separate mail message; (e) attempting to access resources on remote drives; and (f) dropping programs that would run after the system is restarted and would cause the worm code to be scat to other machines using one of the previously described methods.

A profile of a worm is one exhibiting those characteristics that would indicate the use of one or more of the aforementioned methods. For example, a worm profile may include importing a send method from a network dll, or changing a network resource, or attempting to access a system registry for obtaining information that is descriptive of any installed electronic mail programs.

In accordance with these teachings the determination of the behavioral profile of a suspected program (i.e., one suspected of having worm-like behavior, characteristics or attributes) is performed in two stages.

During the first stage, the resources required by the program are determined. Examples of the resources indicative of a potential worm-like behavior include, but need not be limited to: (a) the dynamic link libraries for the network access; (b) methods imported from these libraries that indicate possible attempts to send electronic mail; and (c) dynamic link libraries and methods indicating the automation of existing mail programs such as, for example, OLE or DDE.

During the second stage the suspect program is run one or more times in a controlled non-network environment where accesses to system resources, possibly all accesses, are monitored and logged. To narrow down the results and to reduce the number of false positives, the non-network environment may be configured to appear to have some network capabilities. For example, if a suspected worm is attempting to access address books or check for the presence of electronic mail programs, the environment can provide the expected information in order to elicit a more specific worm-like response. In some cases, it maybe advantageous to install an electronic mail program on the system in order to facilitate a positive response to the suspected program should it attempt to access such a program.

After the one or more program runs are completed, the behavior profile of the program is created based on both the changes made to the system, such as, by example only, a modification of any network dll, and any attempts to access specific resources such as a registry key containing the location of the mail program or of an address book.

Figure 1:
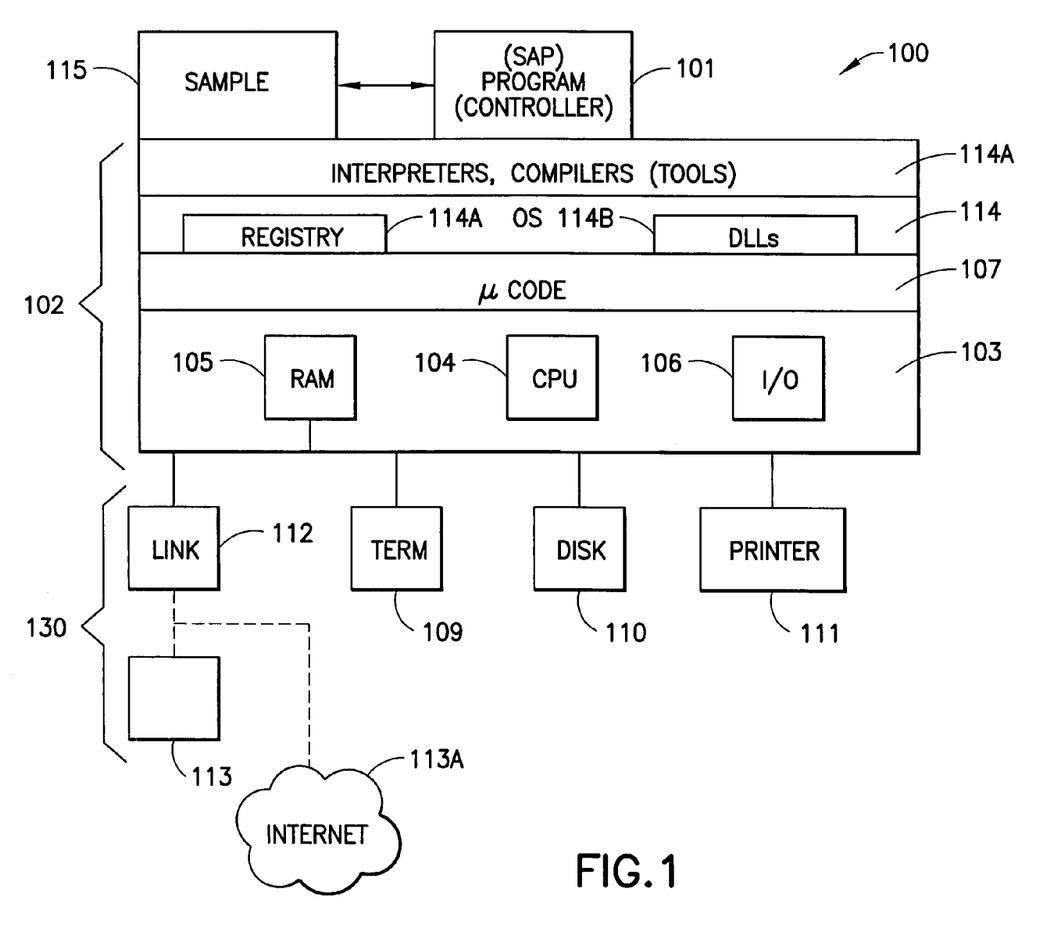
FIG. 1 is a block diagram of a data processing system that is a suitable embodiment for practicing this invention.

A preferred embodiment of this invention runs on one or more of the computer systems 100 shown in FIG. 1, which shows a block diagram of a typical computing system 100 where the preferred embodiment of this invention can be practiced. The computer system 100 includes a computer platform 102 having a hardware unit 103, and a software-analyzing program (SAP) 101, also referred to herein as a controller 101, that implements the methods disclosed below. The SAP 101 operates on the computer platform 102 and hardware unit 103. The hardware unit 103 typically includes one or more central processing units (CPUs) 104, a memory 105 that may include a random access memory (RAM), and an input/output (I/O) interface 106. Microinstruction code 107, for example a reduced instruction set, may also be included on the platform 102. Various peripheral components 130 may be connected to the computer platform 102. Typically provided peripheral components 130 include a display 109, an external data storage device (e.g. tape or disk) 110 where the data used by the preferred embodiment is stored, and where a worm resource profile 205 (see FIG. 2) resides, and a printing device 111. A link 112 may also be included to connect the system 100 to one or more other similar computer systems shown simply as the block 113. The link 112 is used to transmit digital information between the computers 100 and 113. The link 112 may also provide access to the global Internet 113a. An operating system (OS) 114 coordinates the operation of the various components of the computer system 100, and is also responsible for managing various objects and files, and for recording certain information regarding same, such as date and time last modified, file length, etc. Associated with the OS 114 in a conventional manner is a registry 114A, the use of which is discussed below, and system initialization files (SYS_INIT_FILES) and other files, such as dlls 114B. Lying above the OS 114 is a software tools layer 114A containing, for example, compilers, interpreters and other software tools. The interpreters, compilers and other tools in the layer 114A run above the operating system 114 and enable the execution of programs that use methods known to the art.

One suitable and non-limiting example of computer system 100 is the IBM IntelliStation™ (trademark of the International Business Machines Corporation). An example of a suitable CPU is a Pentium™ III processor (trademark of the Intel Corporation); examples of an operating systems are Microsoft Windows™ 2000 (trademark of Microsoft Corporation) and a Redhat build of GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

The SAP or controller 101 operates in accordance with the teachings of this invention to determine possible worm-like behavior resulting from the execution of a suspected malicious program or undesirable software entity, referred to herein generically as a sample 115.

Figure 2:
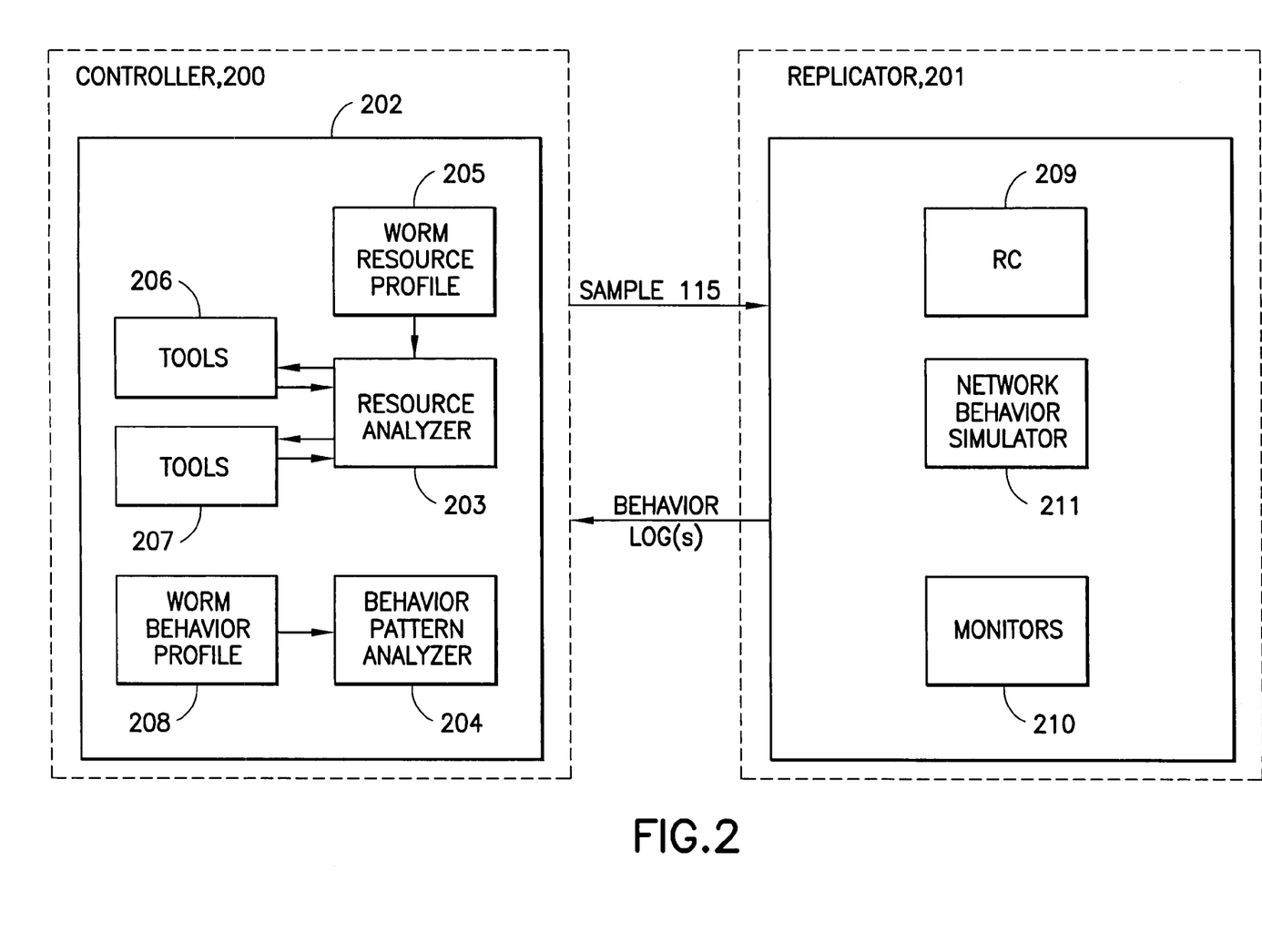
FIG. 2 is a block diagram of a controller unit and a replicator unit that operate in accordance with the teachings of this invention.

A presently preferred, but non-limiting, embodiment of the SAP or controller 101 uses one or multiple computers for implementing a controller subsystem or unit 200 and a replicator subsystem or unit 201, both of which are shown in FIG. 2. A worm-like behavior analyzer 202, which forms a part of the controller 200, uses some of the currently existing tools 114A in order to determine the dlls and the imports used by the suspected program or sample 115.

FIG. 2 is a detailed block diagram of the preferred embodiment of this invention and shows a worm-like behavior analyzer 202 and the environment where the preferred embodiment is run. This environment may be similar to the one described in the commonly assigned U.S. patent application Ser. No. 09/640,453, filed Aug. 17, 2000, entitled "Method and Apparatus for Replicating and Analyzing Worm Programs", William C. Arnold et al., the disclosure of which is incorporated by reference herein in its entirety. It includes several computing systems, one of which is a controller 200 and another one of which is a replicator 201. It should be noted that unlike the replicator described in the commonly assigned U.S. patent application Ser. No. 09/640,453, the replicator 201 does not include an emulated network, though it may contain a component that simulates the appearance of a network to the suspect program or sample 115.

It should further be noted that while the unit 201 is referred to herein as a replicator, its primary function for the purposes of the invention described in this patent application is not to replicate a worm, i.e., provide additional instance of the worm. Instead its primary purpose is to create a system environment, more precisely an emulated system environment, in which to exercise the sample 115, one or more times in one or more ways, so as to determine the behavior of the sample 115 as it pertains to and induces changes in the state of the system environment, as well as to obtain a record or log of the activities of the sample 115 when operating in the (emulated) system environment. Any changes in the system state, and the log of the activities of the executed sample 115, are compared to system state changes and activities known to be associated with worm-like behavior and, if a match occurs, the sample 115 is deemed to exhibit worm-like characteristics. At this point it may be desirable to attempt to replicate the suspected worm to gain further instances thereof for analysis and subsequent identification.

Exercising the sample 115 in a number of "ways" implies, for the purposes of this invention, running the sample program via different system APIs (e.g., system and/or CreateProcess) one or several times, and also exercising the GUI, if the program has a GUI, as described in commonly assigned U.S. patent application Ser. No. 09/754,804, filed Jan. 4, 2001, Method and Apparatus for Exercising an Unknown Program with a Graphical User Interface, Alla Segal et al., incorporated by reference herein in its entirety. Exercising the sample 115 in a number of ways may also be accomplished by running the sample program, then restarting the system and running the program again. These techniques are not intended to be exhaustive of the "ways" in which the sample 115 can be exercised.

The worm-like behavior analyzer 202 includes a resource analyzer 203, also referred to herein as a static analyzer or as a static determination unit, and a behavior pattern analyzer 204, also referred to herein as a dynamic analyzer or as a dynamic determination unit. The behavior pattern analyzer 202 uses tools 206 and 207 that determine a list of dynamic link libraries 114B required by the sample 115 and the methods imported from the dynamic link libraries 114B, respectively. An example of a tool 206, 207 that can be used to determine which dynamic link libraries 114A are required by a program is known as Microsoft DEPENDS.EXE, described in an article "Under the Hood" by Matt Pietrek in the February 1997 issue of the Microsoft Systems Journal and available through the Microsoft Developer Network. An example of a tool 206, 207 that can be used to determine the imports of the sample program 215 is known as DUMPBIN.EXE, which forms a part of the Microsoft Developer Studio™ version 6.0. Other tools for performing the same or similar functions can be found or written by those skilled in the art.

The resource analyzer 203 (static determination) uses these tools to create a profile of the resources used by the suspected program or sample 115, and compares the results to the content of the worm resource profile 205. A typical worm resource profile 205 may include the network dlls 114B such as, as non-limiting examples, WSOCK32.DLL, INETMIBI.DLL, WINSOCK.DLL, MSWSOCK.DLL, WININET. DLL, MAPI32.DLL, MAPI.DLL and WS2_32.DLL, as well as a dll indicating use of OLE automation such as, for example, OLE32.DLL, as well as the list of methods imported from these dynamic link libraries. These imported methods can include, but need not be limited to, the "send", "sendto" and WSAsend methods imported from WSOCK32.DLL, the CoCreateInstance and CoCreateInstanceEx methods from OLE32.DLL, or the DDEConnect method from USER32.DLL.

The behavior pattern analyzer 204 (dynamic determination) creates the behavior profile of a suspected program using the results of the run of the sample 115 on the replicator 201, and compares these results to a worm behavior profile 208. A typical worm behavior pro File 208 includes a list of changes to the system and/or attempts at file and registry access that are indicative of worm-like behavior. The worm behavior profile 208 list may include, but need not be limited to, the following elements: (a) changes to one or more network dlls, but no non-network dlls; (b) creation of one or more files with the VBS extension; (c) creation of any new files and corresponding changes to/creation of the system initialization files 114B that would cause a replacement of any of the network dlls with a new file. An example of this latter scenario is the creation of the file wininit.ini in the Windows directory on a Windows system, where the created wininit.ini file contains instructions such as "WSOCK32.DLL=SOME.FILE", where SOME.FILE is a new file created by the program. The worm behavior profile 208 list may further include (d) a record of attempts to access address books or/and registry keys corresponding to the location of an electronic mail program.

Both the worm resource profile 205 and the worm behavior profile 208 are preferably static in nature, and are preferably created before the sample 115 is run on the replicator 201.

The replicator 201 is invoked by the controller 200 prior to the behavior pattern analysis operation discussed above. The replicator 201 includes a replication controller (RC) 209, behavior monitors 210 and an optional network behavior simulator 211. The replication controller 209 and the behavior monitors 210 may be similar to those described in the above referenced U.S. patent application Ser. No. 09/640,453, filed Aug. 17, 2000, entitled "Method and Apparatus for Replicating and Analyzing Worm Programs", William C. Arnold et al. Note, however, that in this invention a replication controller interface unit may not be necessary, as the RC 209 may be invoked directly.

The network behavior simulator 211 operates in conjunction with the behavior monitors 210 to create an appearance of a network-like behavior to elicit certain worm-like behaviors of the sample 115. For example, the network behavior simulator 211 operates to provide a false network address, such as a false IP address to the sample 215 when the behavior monitor 210 detects a request for an IP address by the sample 115. In this case the sample 115 may request the local IP address to ascertain if the system has network capabilities before displaying worm-like behavior, and a local IP address may be provided to the sample 115 as an inducement for the sample 115 to display worm-like behavior.

In a similar fashion, the environment in which the sample 115 is run can be made to exhibit the presence of system resources and/or objects that do not, in fact, exist. For example, the sample 115 may request information about a specific file, and it may then be advantageous for the environment to respond with the requested information as if the file exists, or to create the file before returning it to the sample 115 as an inducement for the sample to display worm-like behavior. That is, a known non-network environment can be made to exhibit at least one of non-existent local network-related resources and local network-related objects to the program.

Figure 3:
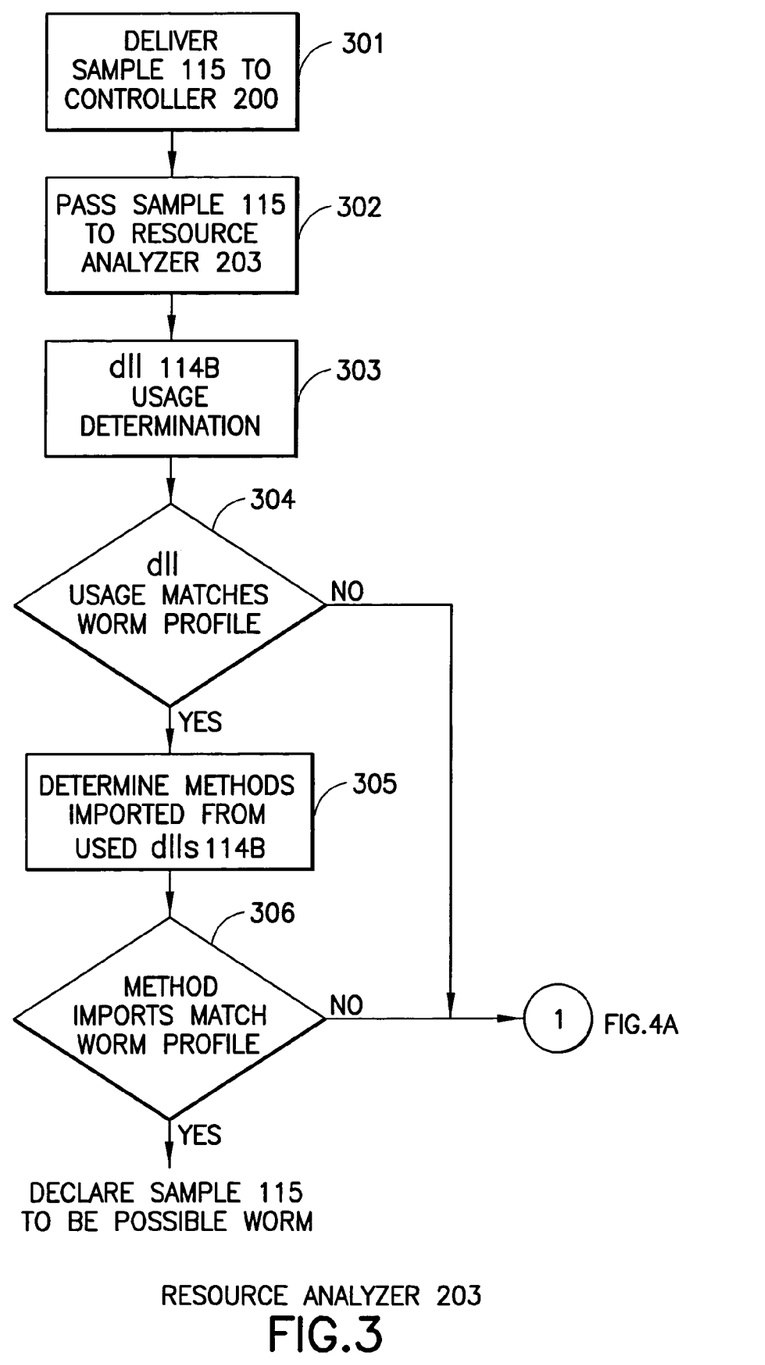
FIG. 3 is a logic flow diagram that illustrates the operation of a resource analyzer component of FIG. 2.

FIGS. 3 and 4 illustrate the overall control flow during the execution of the controller 200 and the replicator 201. In FIG. 3 the sample 115 is first delivered to the controller 200 at step 301, which then passes the sample 115 to the resource analyzer 203 at step 302. The resource analyzer 203 determines which dynamic link libraries 114B are accessed by the sample 115 at step 303, and compares the accessed dlls to those in the worm resource profile 205 (step 304).

If the dll usage matches the worm resource profile 205, the methods imported from these dlls are determined at step 305. If these methods match those contained in the worm resource profile 205 (step 306), the sample 115 is classified as a potential worm. If neither the dll usage or the imported methods match the worm resource profile 205, as indicated by a No indication at either of steps 304 and 306, the sample 115 is passed to the replicator 201, shown in FIG. 4A, for replication and the subsequent behavior pattern determination.

Figure 4A:
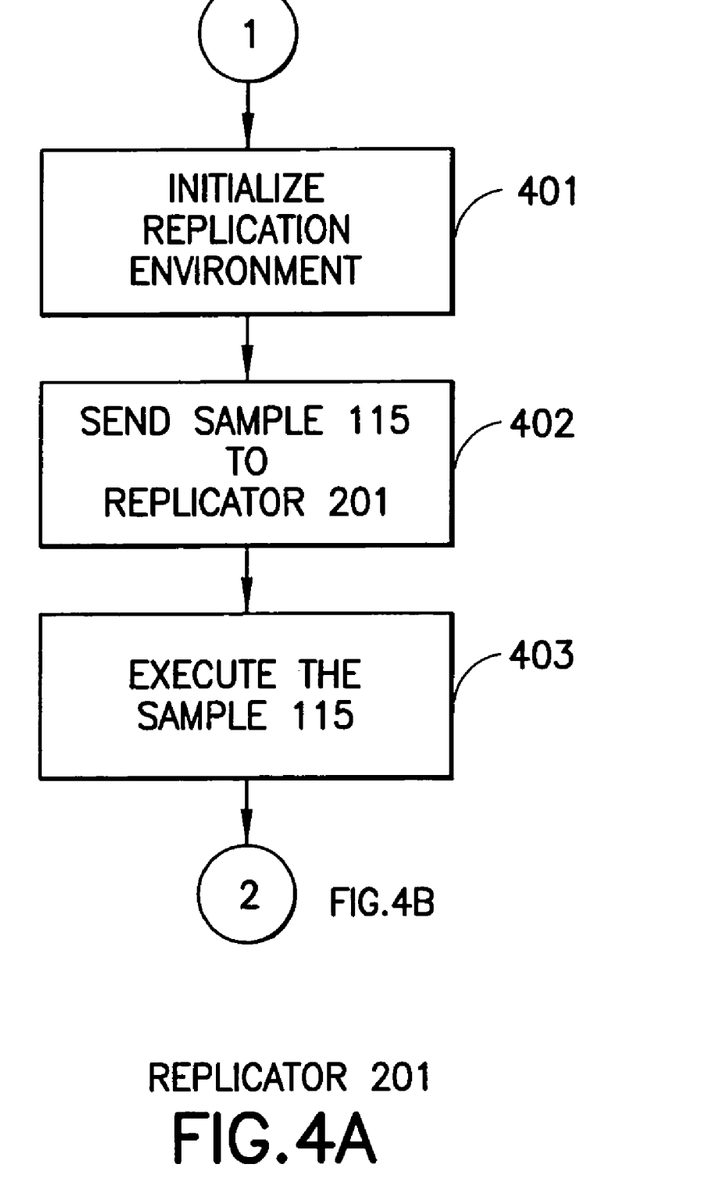
FIGS. 4A and 4B, collectively referred to as FIG. 4, show a logic flow diagram that illustrates the operation of the replicator unit of FIG. 2 and a logic flow diagram that illustrates the operation of a behavior pattern analyzer component of FIG. 2.
Figure 4B:
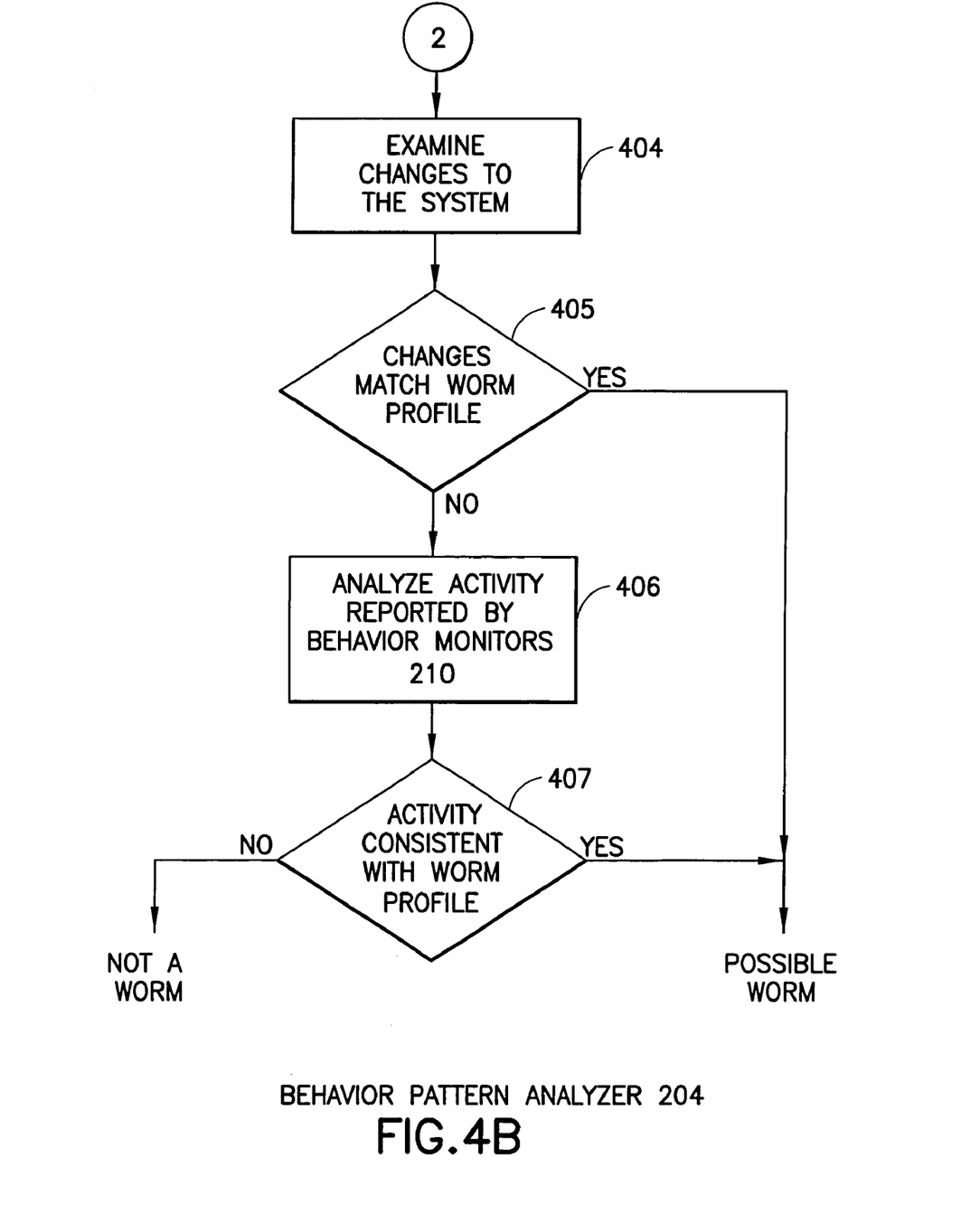

FIG. 4 illustrates the flow of control through the replicator 201 (FIG. 4A) and the behavior pattern analyzer 204 (FIG. 4B). After the replication environment is initialized at step 401, the sample is sent to the replicator 201 at step 402 and is executed at step 403. Control then passes to the behavior pattern analyzer 204 (FIG. 4B) that examines any changes to the system at step 404, and compares detected changes to those in the worm behavior profile 208 at step 405. If there is a match the sample 115 is declared to be a potential worm, otherwise the behavior pattern analyzer 204 analyzes the activity reported by the behavior monitors 210 at step 406 and attempts at step 407 to match the reported sample behavior to the activity patterns (worm-like behavior patterns) listed in the worm behavior profile 208.

If either the changes to the system analyzed at step 404 or the activity reported by the behavior monitors at step 406 contains any of the patterns listed in the worm behavior profile 208, the sample is classified as a potential worm, otherwise the sample 115 is classified as not being a worm. If classified as a worm at step 407, the sample 115A can be provided to a worm replication and analysis system for further characterization. One suitable, but non-limiting type of worm replication and analysis system is the one disclosed in the above-referenced commonly assigned U.S. patent application Ser. No. 09/640,453, filed Aug. 17, 2000, entitled "Method and Apparatus for Replicating and Analyzing Worm Programs", by William C. Arnold et al.

Based on the foregoing description it can be appreciated that an aspect of this invention provides a computer program embodied on a computer readable medium, such as the disk 110, for implementing a method for the automatic determination of the behavioral profile of the sample program 115 suspected of having worm-like characteristics. The execution of the computer program causes the computer 100, 200 to analyze computer system resources required by the sample program 115 and, if the required resources are not indicative of the sample program 115 having worm-like characteristics, further execution of the computer program causes the computer 100, 200, 201 to run the program in a controlled non-network environment while monitoring and logging accesses to system resources to determine the behavior of the program in the non-network environment. The further execution of the computer program may cause the computer to simulate the appearance of a network to the sample program, without emulating the operation of the network.

Note that foregoing description implies that only if the system resource requirements of the sample do not indicate a potential worm (static determination), that the replicator 201 is operated (dynamic determination). In the presently preferred embodiment this is the case, as the static determination process is typically much less computationally expensive than the dynamic determination process, and will typically execute much faster. However, it is within the scope of the teachings of this invention to execute both processes or subsystems when a potential worm is indicated by the first, with the second process or subsystem serving to verify the result of the First. It should be further noted that in some cases it may not be desirable to require that both the static and dynamic determination processes reach the same conclusion as to the worm-like nature of a particular sample 115, as the generation of false negative results might occur. It is thus presently preferred, although not a limitation on the practice of this invention, that one of the static or dynamic processes is relied on to declare a particular sample to be worm-like, enabling the system to switch to processing the sample as a potential virus if worm-like behavior is not indicated.

As was noted above, the sample 115 can typically be processed faster for the static determination executed by resource analyzer 203 (outside of the emulated environment) than for the dynamic determination executed by behavior pattern analyzer 204.

While described in the context of presently preferred embodiments of this invention those having skill in the art will recognize that certain changes in the form and details thereof may be made, but it should be realized that all such modifications will fall within the scope of this invention, and will be encompassed by the claims that follow.

What is claimed is:

1. A method for the automatic determination of potentially worm-like behavior of a program, comprising:
   determining a behavioral profile of the program in an environment that does not emulate the operation of a network, where determining the behavioral profile comprises executing the program in at least one known non-network environment and further comprises:
      using an automated method for examining the environment and determining what changes, if any, have occurred in the environment;
      recording any determined changes as said behavioral profile;
      in response to the program seeking to determine information about a file, creating the file before returning the file to the program as an inducement for the program to display worm-like behavior;
      in response to the program seeking to determine information about an electronic mail program, returning the information to the program as an inducement for the program to display worm-like behavior; and
      determining a dynamic link library usage of the program;
   comparing the determined behavioral profile against a profile indicative of worm-like behavior; and
   providing an indication of potentially worm-like behavior based on the result of the comparison.

2. A method as in claim 1, where the behavioral profile is further determined by determining what system resources are required by the program.

3. A method as in claim 1, where the behavioral profile is further determined by determining what system resources are referred to by the program.

4. A method as in claim 1, where the known non-network environment has an ability to appear to exhibit network-related capabilities.

5. A method as in claim 4 where, in response to the program seeking to determine if the environment has network capabilities, providing a network address to the program as an inducement for the program to display worm-like behavior.

6. A method as in claim 1, where the known non-network environment exhibits at least one of non-existent local network-related resources and local network-related objects to the program.

7. A method as in claim 1 where, in response to the program seeking to determine information about a file, responding as if the file exists as an inducement for the program to display worm-like behavior.

8. A method as in claim 1 where in response to the program seeking to determine information about an electronic mail address book, returning the information to the program as an inducement for the program to display worm-like behavior.

9. A method as in claim 1, where determining the behavioral profile of the program further includes exercising the program in a plurality of ways.

10. A method as in claim 1, where determining the behavioral profile of the program further comprises determining identity of a method imported by the program from a library.

11. A method as in claim 1, where determining the behavioral profile of the program further comprises determining what resources are requested by the program.

12. A method as in claim 11, where said resources comprise at least one of dynamic link libraries for network access, methods imported from dynamic link libraries that indicate a possible attempt to send electronic mail, and dynamic link libraries and methods indicating an automation of an electronic mail program.

13. A method as in claim 1, where determining the behavioral profile of the program further comprises determining if system resources requested by the program match certain predetermined system resources and, if so, executing the program in a controlled environment, determining if system changes made during execution of the program match certain predetermined system changes and, if so, declaring the program to be a possible worm, and if not, determining if activities reported by a program behavior monitor match certain predetermined activities and, if so, declaring the program to be a possible worm.

* * * * *